(12) United States Patent
Wang et al.

(10) Patent No.: US 11,994,795 B2
(45) Date of Patent: May 28, 2024

(54) OPTICAL ELEMENT DRIVING MECHANISM

(71) Applicant: TDK TAIWAN CORP., Taoyuan (TW)

(72) Inventors: Chao-Hsi Wang, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/879,809

(22) Filed: Aug. 3, 2022

(65) Prior Publication Data

US 2023/0043065 A1 Feb. 9, 2023

Related U.S. Application Data

(60) Provisional application No. 63/230,990, filed on Aug. 9, 2021.

(30) Foreign Application Priority Data

Jun. 24, 2022 (CN) .......................... 202210729163.8

(51) Int. Cl.
*G03B 9/38* (2021.01)
*G03B 17/12* (2021.01)

(52) U.S. Cl.
CPC ............... *G03B 9/38* (2013.01); *G03B 17/12* (2013.01)

(58) Field of Classification Search
CPC .......... G03B 11/043; G03B 9/36; G03B 7/01
See application file for complete search history.

(56) References Cited

U.S. PATENT DOCUMENTS

| 2020/0249415 | A1* | 8/2020 | Wang | G03B 30/00 |
| 2022/0091478 | A1* | 3/2022 | Sawanobori | G06F 1/1686 |
| 2022/0120997 | A1* | 4/2022 | Wang | G02B 7/005 |
| 2022/0121086 | A1* | 4/2022 | Wang | G03B 11/00 |
| 2022/0382129 | A1* | 12/2022 | Wu | G03B 9/36 |
| 2023/0026738 | A1* | 1/2023 | Ushio | H04N 23/51 |

* cited by examiner

*Primary Examiner* — Clayton E. LaBalle
*Assistant Examiner* — Diana Hancock
(74) *Attorney, Agent, or Firm* — Muncy, Geissler, Olds & Lowe, P.C.

(57) ABSTRACT

An optical element driving mechanism includes a first movable part, a fixed assembly and a first driving assembly. The first movable part includes an optical element, and the first movable part is movable relative to the fixed assembly. The first driving assembly is configured to drive the first movable part to move relative to the fixed assembly. The optical element driving mechanism further includes a strengthening assembly configured to strengthen the fixed assembly to bear a force along a first axis.

19 Claims, 14 Drawing Sheets

OPTICAL ELEMENT DRIVING MECHANISM

CROSS REFERENCE TO RELATED APPLICATIONS

This application claims the benefit of U.S. Provisional Application No. 63/230,990, filed on Aug. 9, 2021, and China Patent Application No. 202210729163.8, filed on Jun. 24, 2022, the entirety of which are incorporated by reference herein.

BACKGROUND OF THE DISCLOSURE

Field of the Disclosure

The present disclosure relates to an optical element driving mechanism, and in particular it relates to an optical element driving mechanism with a shutter structure.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

BRIEF SUMMARY OF THE DISCLOSURE

According to some embodiments of the disclosure, the present disclosure provides an optical element driving mechanism, which includes a first movable part, a fixed assembly and a first driving assembly. The first movable part includes an optical element, and the first movable part is movable relative to the fixed assembly. The first driving assembly is configured to drive the first movable part to move relative to the fixed assembly. The optical element driving mechanism further includes a strengthening assembly configured to strengthen the fixed assembly to bear a force along a first axis.

According to some embodiments, the strengthening assembly includes: a first side wall, extending along the first axis; a second side wall, extending along the first axis; a third side wall, extending along the first axis; a first supporting portion, corresponding to the first side wall; a second supporting portion corresponding to the second side wall; and a third supporting portion, corresponding to the third side wall. In the first axis, a shortest distance between the first side wall and the first supporting portion is smaller than a shortest distance between the fixed assembly and an optical module corresponding to the optical element driving mechanism.

According to some embodiments, when the optical element driving mechanism is subjected to an external force along the first axis, the first side wall is in contact with the first supporting portion, the second side wall is in contact with the second supporting portion, and the third side wall is in contact with the third supporting portion so that the external force is distributed to the first supporting portion, the second supporting portion and the third supporting portion.

According to some embodiments, the fixed assembly includes an outer frame and a base. The outer frame is configured to be fixedly connected to the base. The first side wall, the second side wall and the third side wall are located on the outer frame. The second supporting portion and the third supporting portion are located on the base. When the outer frame is assembled to the base, the first side wall having the plate-shaped structure is not parallel to the second side wall having the plate-shaped structure. When the outer frame is assembled to the base, the second side wall having the plate-shaped structure is not parallel to the third side wall having the plate-shaped structure.

According to some embodiments, when the outer frame is assembled to the base, the second side wall is not parallel to the first axis. When the outer frame is assembled to the base, the third side wall is not parallel to the first axis. A first slit is formed between the second side wall and the base in a second axis. A second slit is formed between the third side wall and the base in the second axis. The first slit or the second slit is less than 0.02 mm. The second axis is perpendicular to the first axis.

According to some embodiments, a first glue groove is formed between the outer frame and the base, and is configured to accommodate a first adhesive element. The first glue groove is communicated with the first slit, so that the first adhesive element flows into the first slit. A second glue groove is formed between the outer frame and the base, and is configured to accommodate a second adhesive element. The second glue groove is communicated with the second slit, so that the second adhesive element flows into the second slit.

According to some embodiments, the second side wall includes a first front side portion configured to be in contact with the second supporting portion. The first front side portion has a first inclined surface. The base has a second inclined surface corresponding to the first inclined surface. When the outer frame is configured to be installed on the base, the second inclined surface is configured to guide the first inclined surface.

According to some embodiments, after the outer frame is assembled to the base, the second inclined surface does not contact the first inclined surface. The base further has an arc blocking portion protruding from the second inclined surface. The first front side portion further has an avoiding groove corresponding to the arc blocking portion. A radius of curvature of the arc blocking portion is smaller than a radius of curvature of the avoiding groove. The arc blocking portion is configured to block the avoiding groove to prevent the outer frame from separating from the base.

According to some embodiments, when viewed along the second axis, the arc blocking portion does not contact the avoiding groove. A space is formed between the arc blocking portion and an outer side surface of the base in the second axis.

According to some embodiments, the second side wall further includes a first rear side portion configured to be in contact with the second supporting portion. When viewed along the second axis, in a third axis, another space is formed between the first rear side portion and the base. The third axis is perpendicular to the second axis and the first axis.

According to some embodiments, the base further has a first supporting surface configured to support the outer frame. The base further has a positioning boss which protrudes from the first supporting surface along the first axis. The outer frame has a positioning hole, corresponding to the positioning boss. The positioning boss is configured to be engaged with the positioning hole. In the first axis, a maximum distance between the positioning boss and the first supporting surface is smaller than a maximum distance between the positioning hole and the first supporting surface.

According to some embodiments, the base further includes a supporting bump configured to support the outer frame. In the third axis, the supporting bump is located between the first side wall and the first movable part. The base further has a second supporting surface disposed on the supporting bump and is configured to be in contact with a bottom surface of the outer frame. In the first axis, a distance between the second supporting surface and the outer frame is greater than a distance between the base and the outer frame.

According to some embodiments, the base further includes a supporting protruding portion disposed on the second supporting surface of the supporting bump. The outer frame further includes a receiving opening configured to accommodate the supporting protruding portion. When viewed along the third axis, a size of the receiving opening is greater than a size of the supporting protruding portion. When viewed along the third axis, a maximum distance between the supporting protruding portion and the second supporting surface in the first axis is less than a maximum distance between the receiving opening and the second supporting surface in the first axis.

According to some embodiments, the optical element has a first trench configured to accommodate the supporting bump. When viewed along the second axis, the supporting bump overlaps the first trench.

According to some embodiments, the first driving assembly is configured to drive the first movable part to move between a first position and a second position. The base has a first rear groove configured to accommodate a first buffering element. When the first movable part is located in the first position, the first movable part is in contact with the first buffering element. The first buffering element is made of sponge, soft plastic, silicone, or a combination thereof.

According to some embodiments, the base further has a second rear groove communicated with the first rear groove. The first rear groove is adjacent to the positioning boss. When viewed along the first axis, the first buffering element overlaps at least a part of the first rear groove. The second rear groove is configured to receive a first attaching element. The first attaching element is configured to fixedly attach the first buffering element to the base.

According to some embodiments, the optical element driving mechanism further includes a second buffering element disposed in an accommodation space of the base. When the first movable part is located in the second position, the first movable part is in contact with the second buffering element. The second buffering element is made of sponge, soft plastic, silicone, or a combination thereof. When viewed along the first axis, the first movable part is located between the second buffering element and the first buffering element. The optical element driving mechanism further includes a second attaching element configured to fixedly attach the second buffering element to the base.

According to some embodiments, the optical element driving mechanism further includes a second movable part, a second driving assembly and a blocking member. The second driving assembly is configured to drive the second movable part to rotate around the first axis. In the first axis, the second movable part is located between the blocking member and the second driving assembly. The blocking member is configured to block the second movable part and the second driving assembly from separating from the base. The second buffering element is disposed on the blocking member and is in direct contact with the blocking member.

According to some embodiments, a holder of the first movable part is connected to the optical element through a third attaching element. The outer frame further has a second trench corresponding to the third attaching element. When viewed along the second axis, the third attaching element overlaps the second trench. When viewed along the third axis, the third attaching element overlaps the second trench. When viewed along the second axis, the third attaching element does not protrude from the second trench. When viewed along the third axis, the third attaching element does not protrude from the second trench.

According to some embodiments, the optical module is disposed on the first supporting portion. The optical module is electrically connected to the first supporting portion. The optical module has a camera lens. The base has a receiving groove configured to accommodate the optical module. When viewed along the first axis, the base overlaps a part of the optical module. When viewed along the first axis, the camera lens does not overlap the base.

The present disclosure provides an optical element driving mechanism, including a first movable part, a fixed assembly, and a first driving assembly. The first movable part includes an optical element, and the first movable part is movable relative to the fixed assembly. The first driving assembly is configured to drive the first movable part to move relative to the fixed assembly. The optical element driving mechanism further includes a strengthening assembly configured to strengthen the fixed assembly to bear a force along a first axis.

In addition, in some embodiments, the first front side portion of the outer frame has a first inclined surface, and the base has a second inclined surface corresponding to the first inclined surface. When the outer frame is configured to be installed on the base, the second inclined surface can guide the first inclined surface, so that the outer frame is smoothly installed on the base.

Furthermore, in some embodiments, when the optical element driving mechanism is subjected to the external force along the first axis, the first side wall is in contact with the first supporting portion, the second side wall is in contact with the second supporting portion, and the third side wall is in contact with the third supporting portion, so that the external force is distributed to the first supporting portion, the second supporting portion and the third supporting portion. Based on this structural configuration, the situation in which the optical element driving mechanism is crushed can be avoided.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
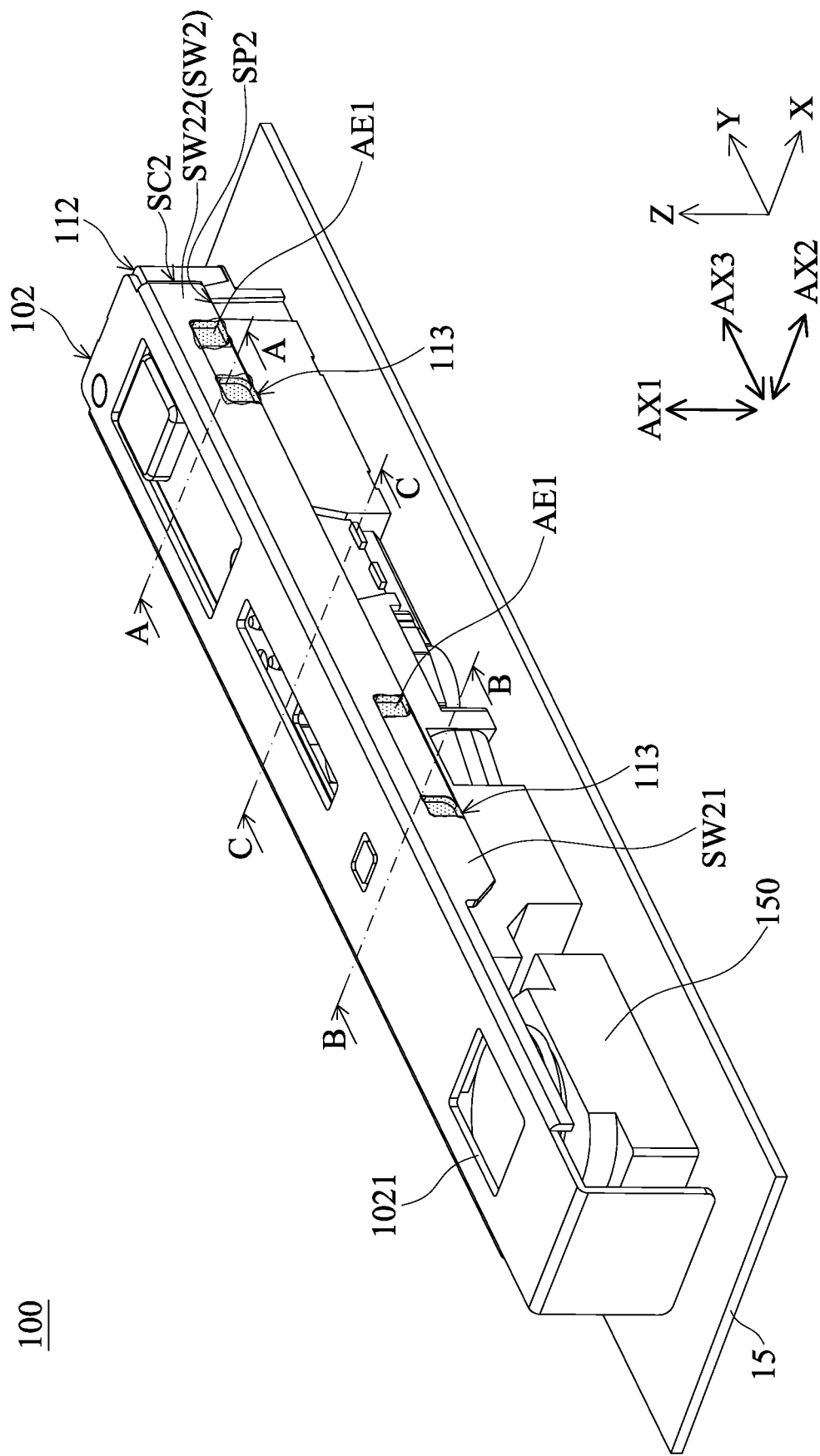
FIG. 1 shows a schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
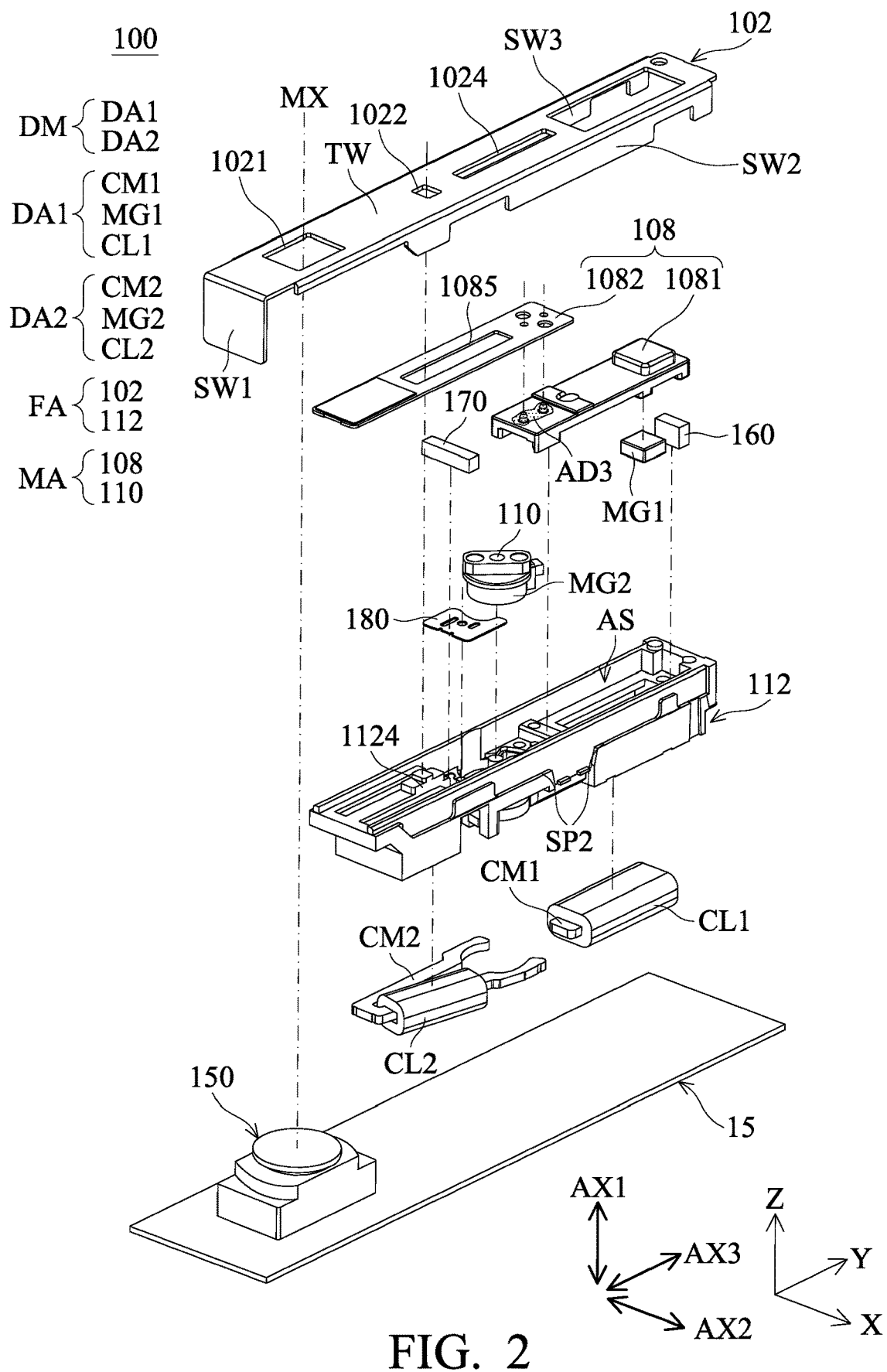
FIG. 2 shows an exploded diagram of the optical element driving mechanism 100 according to the embodiment of the present disclosure.

Please refer to FIG. 1 to FIG. 2. FIG. 1 shows a schematic diagram of an optical element driving mechanism 100 according to an embodiment of the present disclosure, and FIG. 2 shows an exploded diagram of the optical element driving mechanism 100 according to the embodiment of the present disclosure. The optical element driving mechanism 100 can be an optical camera system and can be configured to hold and drive an optical element. The optical element driving mechanism 100 can be installed in different electronic devices or portable electronic devices, such as a smartphone, for allowing a user to perform the image capturing function.

In this embodiment, the optical element driving mechanism 100 may include a fixed assembly FA, a movable assembly MA, and a driving module DM. The movable assembly MA is movably connected to the fixed assembly FA. The driving module DM is configured to drive the movable assembly MA to move relative to the fixed assembly FA.

In this embodiment, as shown in FIG. 2, the fixed assembly FA includes an outer frame 102, and a base 112. The movable assembly MA may include a first movable part 108, and a second movable part 110. The first movable part 108 may include a holder 1081 and an optical element 1082. In this embodiment, the optical element 1082 can be used as a light-shielding film or a shutter, but it is not limited thereto. In other embodiments, the optical element 1082 can also be used as a filter or aperture, and so on.

In this embodiment, the holder 1081 is detachably connected to the optical element 1082, but it is not limited thereto. For example, in other embodiments, the optical element 1082 can be connected to the holder 1081 by insert molding technology. For example, the holder 1081 may be made of a non-metal material, such as a plastic material, and the optical element 1082 may be made of a metal material.

The outer frame 102 is fixedly connected to the base 112, the outer frame 102 can be combined with the base 112 to cooperatively accommodate the movable assembly MA and the driving module DM, and the first movable part 108 is movable relative to the fixed assembly FA.

As shown in FIG. 2, the aforementioned outer frame 102 has a first opening 1021, and the base 112 accommodate an optical module 150 (for example, a photosensitive module). The first opening 1021 is configured to allow an external light traveling along a main axis MX to pass and to be received by the aforementioned optical module 150 so as to generate a digital image signal.

As shown in FIG. 2, the optical element driving mechanism 100 is disposed on a first supporting portion 15. The first supporting portion 15 is, for example, a main circuit board in an electronic device, but it is not limited thereto. The optical element driving mechanism 100 is electrically connected to the first supporting portion 15.

Figure 3:
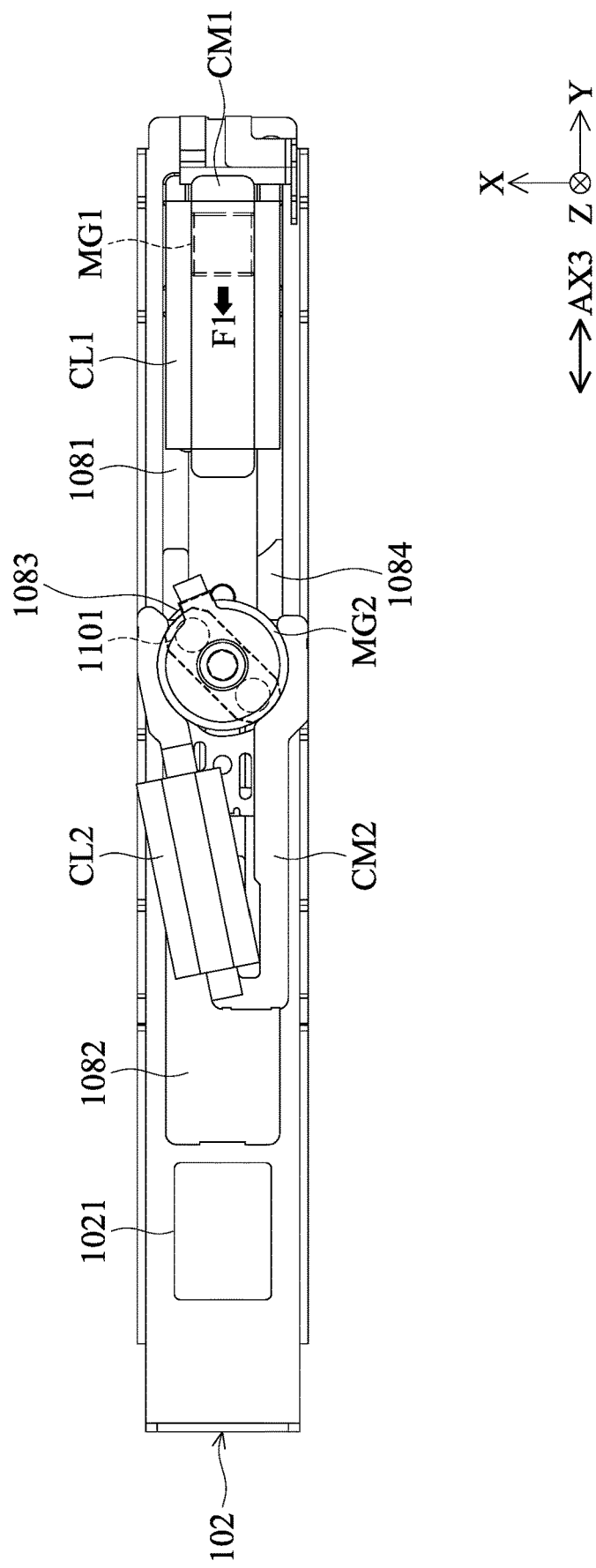
FIG. 3 is a bottom view of a partial structure of the optical element driving mechanism 100 according to an embodiment of the present disclosure.
Figure 4:
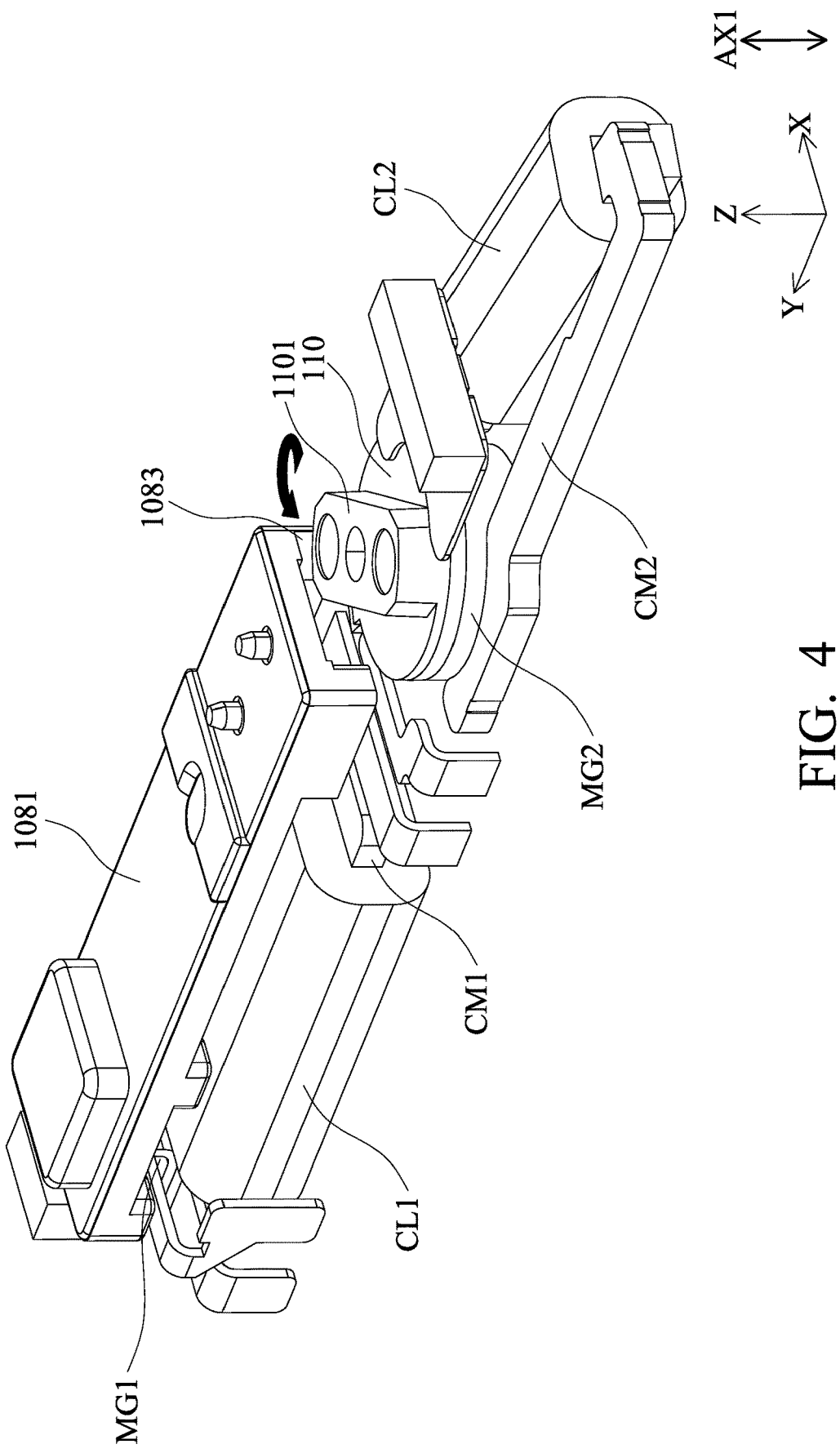
FIG. 4 is a perspective view of a partial structure of the optical element driving mechanism 100 according to an embodiment of the present disclosure.
Figure 5:
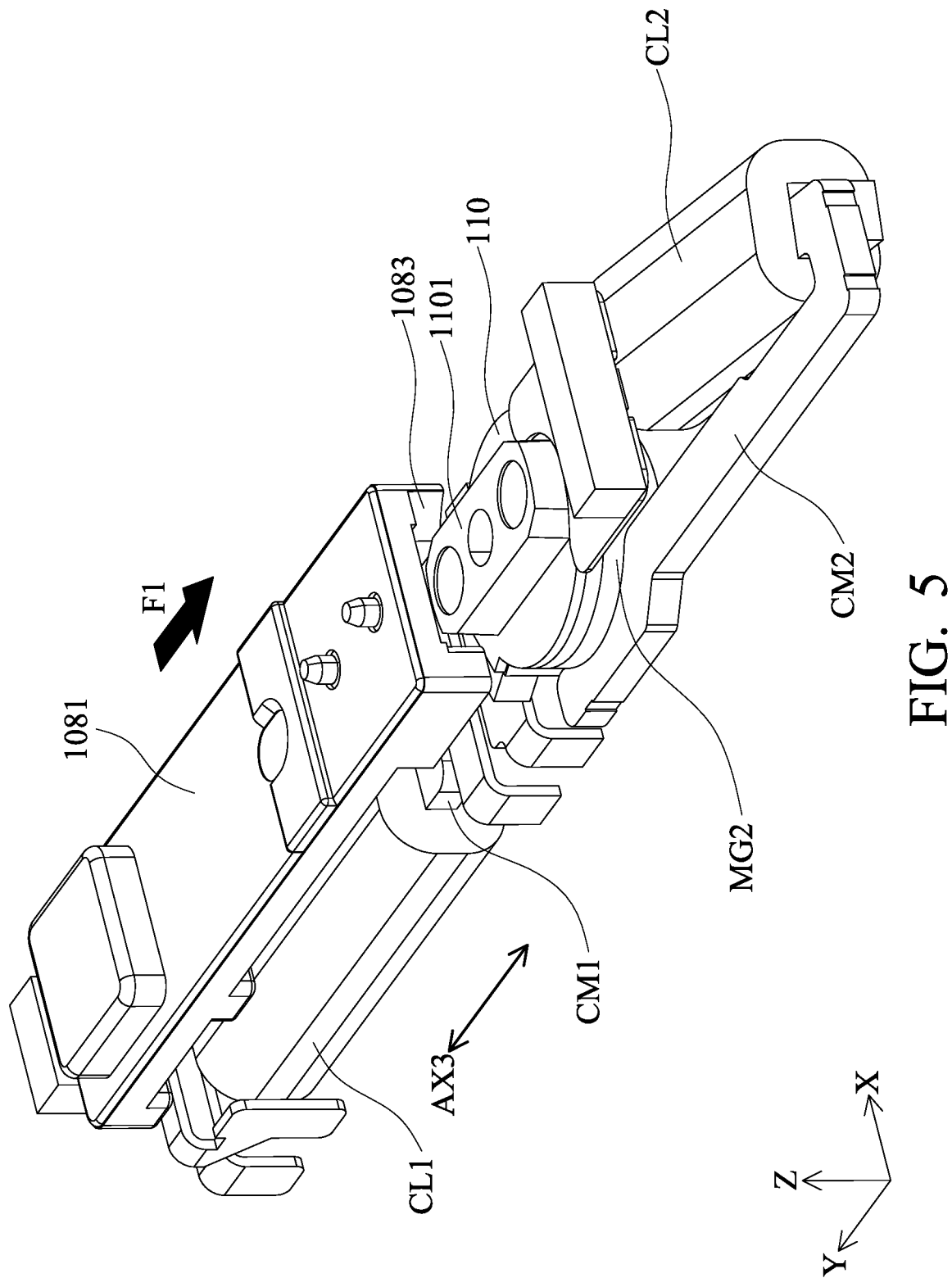
FIG. 5 is a perspective view of the second movable part 110 after rotation according to an embodiment of the present disclosure.
Figure 6:
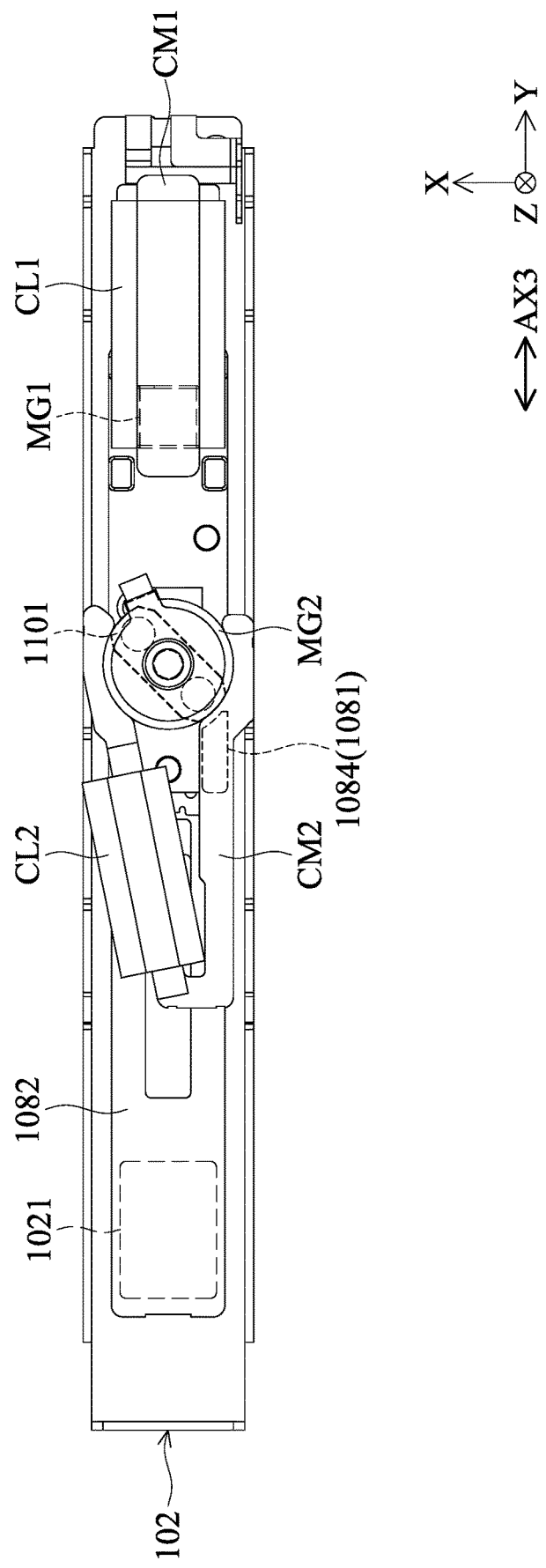
FIG. 6 is a bottom view illustrating that the first movable part 108 covers the first opening 1021 according to an embodiment of the present disclosure.

Please refer to FIG. 1 to FIG. 6. FIG. 3 is a bottom view of a partial structure of the optical element driving mechanism 100 according to an embodiment of the present disclosure, FIG. 4 is a perspective view of a partial structure of the optical element driving mechanism 100 according to an embodiment of the present disclosure, FIG. 5 is a perspective view of the second movable part 110 after rotation according to an embodiment of the present disclosure, and FIG. 6 is a bottom view illustrating that the first movable part 108 covers the first opening 1021 according to an embodiment of the present disclosure.

In this embodiment, the driving module DM may include a first driving assembly DA1 configured to drive the first movable part 108 to move relative to the fixed assembly FA along a third axis AX3 (the Y-axis), so that the optical element 1082 can selectively overlaps the first opening 1021. The driving module DM may further include a second driving assembly DA2, and the second driving assembly DA2 is configured to drive the second movable part 110 to rotate around a first axis (the X-axis) relative to the fixed assembly FA.

The first driving assembly DA1 includes a first coil CL1, a first magnetically conductive element CM1 and a first magnetic element MG1. The first magnetic element MG1 corresponds to the first coil CL1 and is fixed on the bottom of the holder 1081. The first magnetically conductive element CM1 corresponds to the first coil CL1. For example, the first coil CL1 surrounds the first magnetically conductive element CM1. The first magnetically conductive element CM1 has a magnetically conductive material and has a long strip-shaped structure.

The second driving assembly DA2 includes a second coil CL2, a second magnetic element MG2 and a second magnetically conductive element CM2. The second magnetic element MG2 corresponds to the second coil CL2 and is fixed on the second movable part 110. The second magnetically conductive element CM2 corresponds to the second coil CL2. For example, the second coil CL2 surrounds the second magnetically conductive element CM2. The second magnetically conductive element CM2 has a magnetically conductive material and has a clamp-shaped structure, and the second magnetically conductive element CM2 is fixedly disposed in an accommodation space AS of the base 112.

As shown in FIG. 1 and FIG. 3, when viewed along the first axis AX1, and when the first movable part 108 is located in the first position in FIG. 3, the optical element 1082 does not overlap at least a part of the first opening 1021. Furthermore, as shown in FIG. 4, when the second driving assembly DA2 is not operating, a blocking portion 1101 of the second movable part 110 is in contact with a side stopping portion 1083 of the holder 1081 so that the first movable part 108 is stably located in the first position.

When it is desired to drive the optical element 1082 to cover the first opening 1021, the second coil CL2 is energized to act with the second magnetic element MG2 to generate an electromagnetic driving force, so as to drive the second movable part 110 to rotate around the first axis AX1 from the position in FIG. 4 to the position in FIG. 5. As shown in FIG. 5, the extending direction of the blocking portion 1101 is parallel to the third axis AX3, and the blocking portion 1101 does not contact the holder 1081.

Next, the first coil CL1 is energized to act with the first magnetic element MG1 to generate an electromagnetic driving force F1 to drive the first movable part 108 to move along the third axis AX3 from the first position in FIG. 3 to the second position in FIG. 6. At this time, the second driving assembly DA2 can drive the second movable part 110 to rotate around the first axis AX1 again, so that the extending direction of the blocking portion 1101 is not parallel to the third axis AX3, and then the blocking portion 1101 is in contact with the other side stopping portion 1084 of the holder 1081 so that the first movable part 108 is stably located in the second position.

As shown in FIG. 6, when viewed along the first axis AX1, and when the first movable part 108 is located in the second position in the FIG. 6, the optical element 1082 overlaps at least a part of the first opening 1021 to avoid the light entering the optical module 150.

Figure 7:
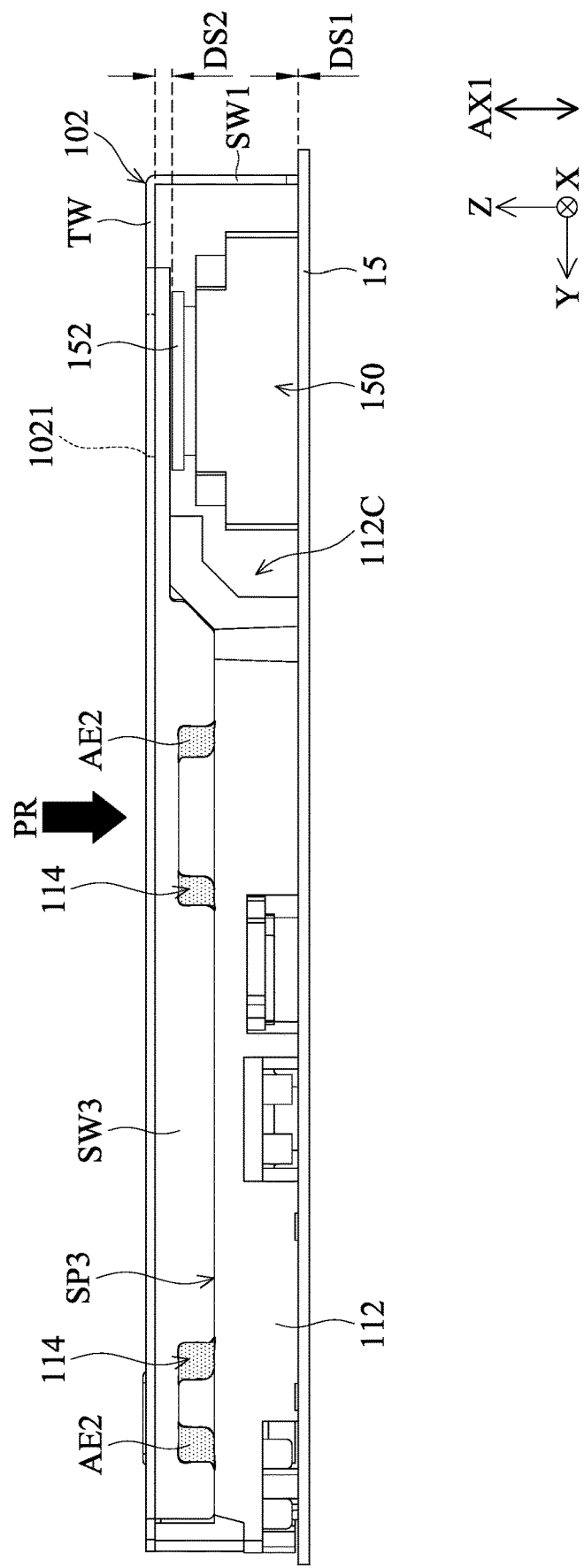
FIG. 7 is a side view of the optical element driving mechanism 100 according to an embodiment of the present disclosure.
Figure 8:
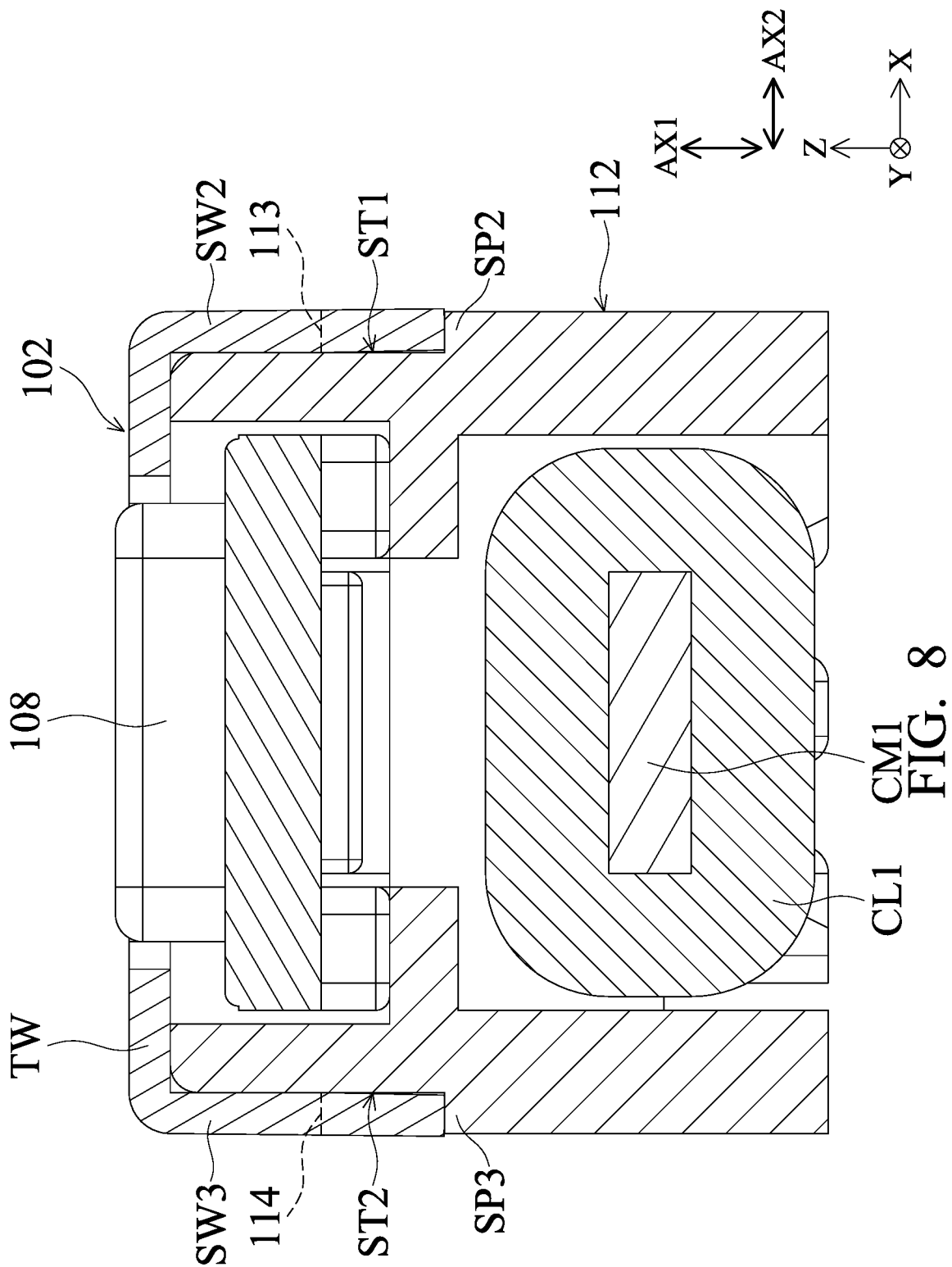
FIG. 8 is a cross-sectional view of the optical element driving mechanism 100 along line A-A in FIG. 1 according to an embodiment of the present disclosure.

Please refer to FIG. 1, FIG. 2, FIG. 7 and FIG. 8. FIG. 7 is a side view of the optical element driving mechanism 100 according to an embodiment of the present disclosure, and FIG. 8 is a cross-sectional view of the optical element driving mechanism 100 along line A-A in FIG. 1 according to an embodiment of the present disclosure. In this embodiment, the outer frame 102 includes a top wall TW, a first side wall SW1, a second side wall SW2, and a third side wall SW3. The first side wall SW1, the second side wall SW2 and the third side wall SW3 are extended from the top wall TW along the first axis AX1.

In this embodiment, the first side wall SW1, the second side wall SW2 and the third side wall SW3 can be collectively referred to as a strengthening assembly. Furthermore, the strengthening assembly may further include the first supporting portion 15, a second supporting portion SP2 and a third supporting portion SP3. The first supporting portion 15 corresponds to the first side wall SW1, the second supporting portion SP2 corresponds to the second side wall SW2, and the third supporting portion SP3 corresponds to the third side wall SW3.

As shown in FIG. 7, in the first axis AX1, the shortest distance DS1 between the first side wall SW1 and the first supporting portion 15 is smaller than the shortest distance DS2 between the outer frame 102 of the fixed assembly FA and the optical module 150 corresponding to the optical element driving mechanism 100. In this embodiment, the shortest distance DS1 may be zero. Based on this structural design, it can be ensured that when the outer frame 102 is subjected to the force along the Z-axis, the first side wall SW1 can contact the first supporting portion 15, so that the optical module 150 is not touched and damaged by the outer frame 102.

In the present disclosure, the strengthening assembly is configured to strengthen the fixed assembly FA to withstand the force along the first axis AX1. For example, when the optical element driving mechanism 100 is subjected to an external force PR along the first axis AX1, the first side wall SW1 is in contact with the first supporting portion 15, the second side wall SW2 is in contact with the second supporting portion SP2, and the third side wall SW3 is in contact with the third supporting portion SP3, so that the external force PR is distributed to the first supporting portion 15, the second supporting portion SP2 and the third supporting portion SP3. Based on this structural configuration, the situation in which the optical element driving mechanism 100 is crushed can be avoided.

In addition, as shown in FIG. 7, the optical module 150 is disposed on the first supporting portion 15, the optical module 150 is electrically connected to the first supporting portion 15, and the optical module 150 has a camera lens 152. The base 112 has a receiving groove 112C configured to receive the optical module 150.

In this embodiment, the base 112 overlaps a portion of the optical module 150 when viewed along the first axis AX1. The camera lens 152 does not overlap the base 112 when viewed along the first axis AX1. Based on this structural design, the optical element driving mechanism 100 can be miniaturized.

In this embodiment, the first side wall SW1, the second side wall SW2 and the third side wall SW3 are located on the outer frame 102, and the second supporting portion SP2 and the third supporting portion SP3 are located on the base 112. When the outer frame 102 is assembled to the base 112, the first side wall SW1 having the plate-shaped structure is not parallel to the second side wall SW2 having the plate-shaped structure. In addition, when the outer frame 102 is assembled to the base 112, the second side wall SW2 having the plate-shaped structure is not parallel to the third side wall SW3 having the plate-shaped structure.

Specifically, as shown in FIG. 8, when the outer frame 102 is assembled to the base 112, the second side wall SW2 is not parallel to the first axis AX1, and when the outer frame 102 is assembled to the base 112, the third side wall SW3 is not parallel to the first axis AX1.

Specifically, a first slit ST1 is formed between the second side wall SW2 and the base 112 in a second axis AX2 (the X-axis), and a second slit ST2 is formed between the third side wall SW3 and the base 112 in the second axis AX2. For example, the first slit ST1 or the second slit ST2 is smaller than 0.02 mm, but it is not limited thereto. The second axis AX2 is perpendicular to the first axis AX1.

As shown in FIG. 1 and FIG. 8, at least one first glue groove 113 is formed between the outer frame 102 and the base 112, and is configured to accommodate a first adhesive element AE1. In this embodiment, the first glue groove 113 is communicated with the first slit ST1, so that the first adhesive element AE1 flows into the first slit ST1.

Similarly, as shown in FIG. 7 and FIG. 8, at least a second glue groove 114 is formed between the outer frame 102 and the base 112, and is configured to accommodate a second adhesive element AE2. The second glue groove 114 is communicated with the second slit ST2, so that the second adhesive element AE2 flows into the second slit ST2. The first adhesive element AE1 and the second adhesive element AE2 are configured to fix the outer frame 102 to the base 112.

Figure 9:
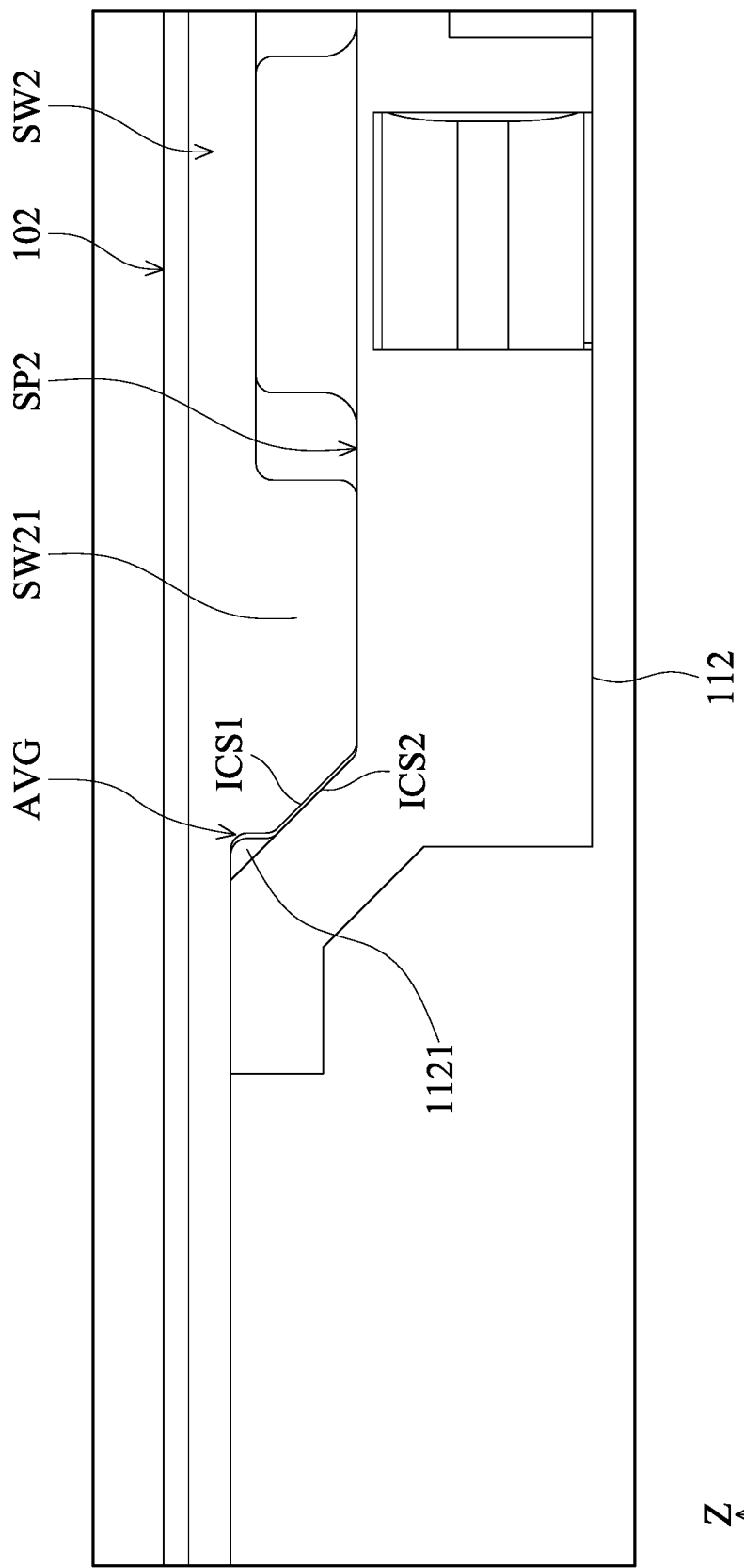
FIG. 9 is an enlarged side view of the optical element driving mechanism 100 according to an embodiment of the present disclosure.
Figure 10:
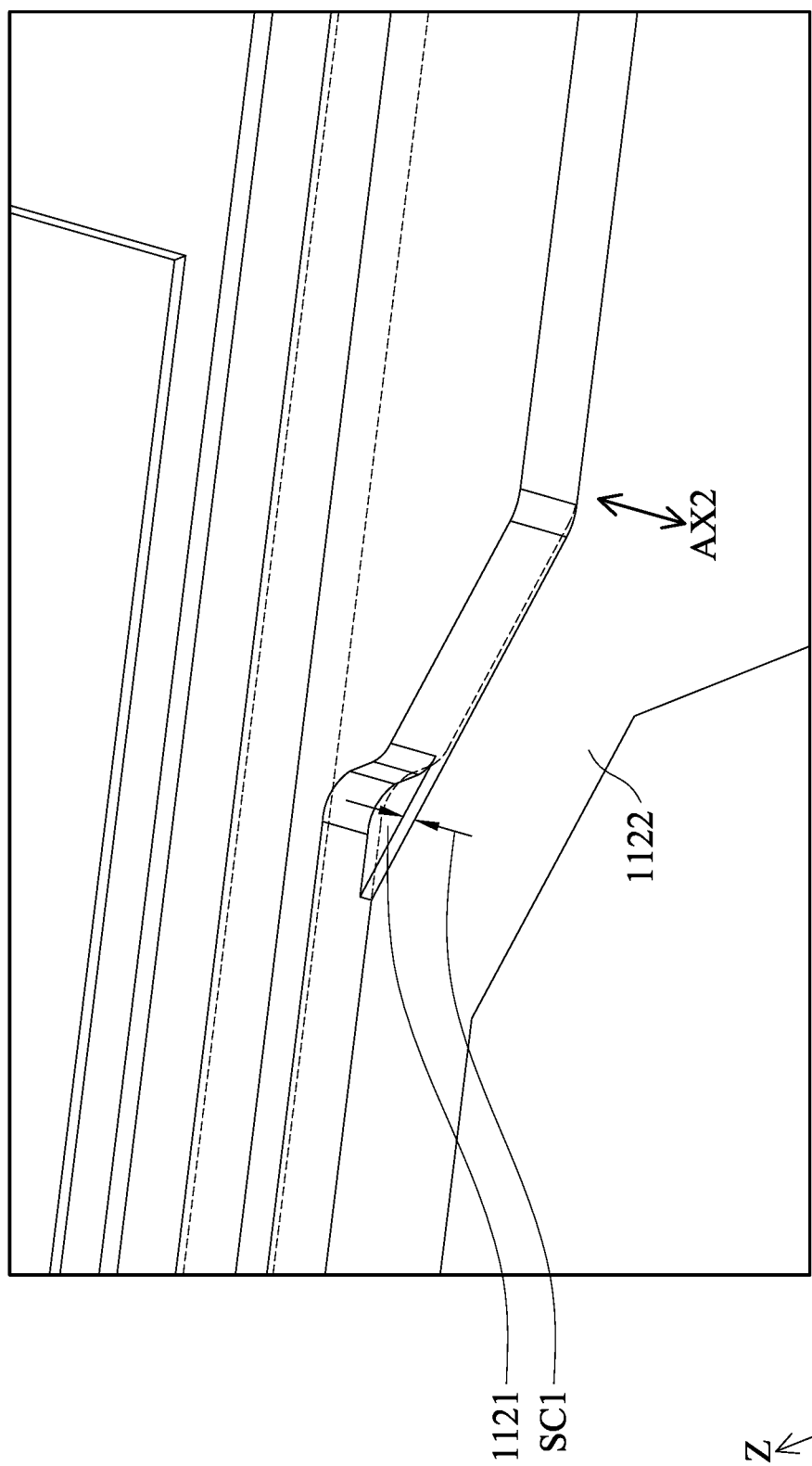
FIG. 10 is an enlarged schematic diagram of the optical element driving mechanism 100 according to an embodiment of the present disclosure.

Please refer to FIG. 9 and FIG. 10. FIG. 9 is an enlarged side view of the optical element driving mechanism 100 according to an embodiment of the present disclosure, and FIG. 10 is an enlarged schematic diagram of the optical element driving mechanism 100 according to an embodiment of the present disclosure. In this embodiment, the second side wall SW2 includes a first front side portion SW21 configured to be in contact with the second supporting portion SP2.

The first front side portion SW21 has a first inclined surface ICS1, and the base 112 has a second inclined surface ICS2 corresponding to the first inclined surface ICS1. When the outer frame 102 is configured to be installed on the base 112, the second inclined surface ICS2 can guide the first inclined surface ICS1, so that the outer frame 102 is smoothly installed on the base 112. It is worth noting that when the outer frame 102 is assembled to the base 112, the second inclined surface ICS2 does not contact the first inclined surface ICS1.

In this embodiment, the base 112 may further have an arc blocking portion 1121 protruding from the second inclined surface ICS2. The first front side portion SW21 may further have an avoiding groove AVG corresponding to the arc blocking portion 1121.

In this embodiment, the radius of curvature of the arc blocking portion 1121 is smaller than the radius of curvature of the avoiding groove AVG. The arc blocking portion 1121 is configured to block the avoiding groove AVG to prevent the outer frame 102 from separating from the base 112.

When viewed along the second axis AX2 (the X-axis) perpendicular to the first axis AX1, the arc blocking portion 1121 does not contact the avoiding groove AVG. It should also be noted that, as shown in FIG. 10, a space SC1 is formed between the arc blocking portion 1121 and an outer side surface 1122 of the base 112 in the second axis AX2 to provide an adjustable space, thereby improving the assembly accuracy. In addition, it can prevent the outer frame 102 and the base 112 from interfering with each other. Furthermore, if the outer frame 102 is made of metal, its processing will be more precise and more convenient to assembly.

In addition, as shown in FIG. 1, the second side wall SW2 further includes a first rear side portion SW22 configured to be in contact with the second supporting portion SP2. When viewed along the second axis AX2, in the third axis AX3 (the Y-axis), a space SC2 is formed between the first rear side portion SW22 and the base 112. The third axis AX3 is perpendicular to the second axis AX2 and the first axis AX1. Based on this structural configuration, the space SC2 can serve as a tolerance to ensure that the outer frame 102 can be installed smoothly on the base 112.

Figure 11:
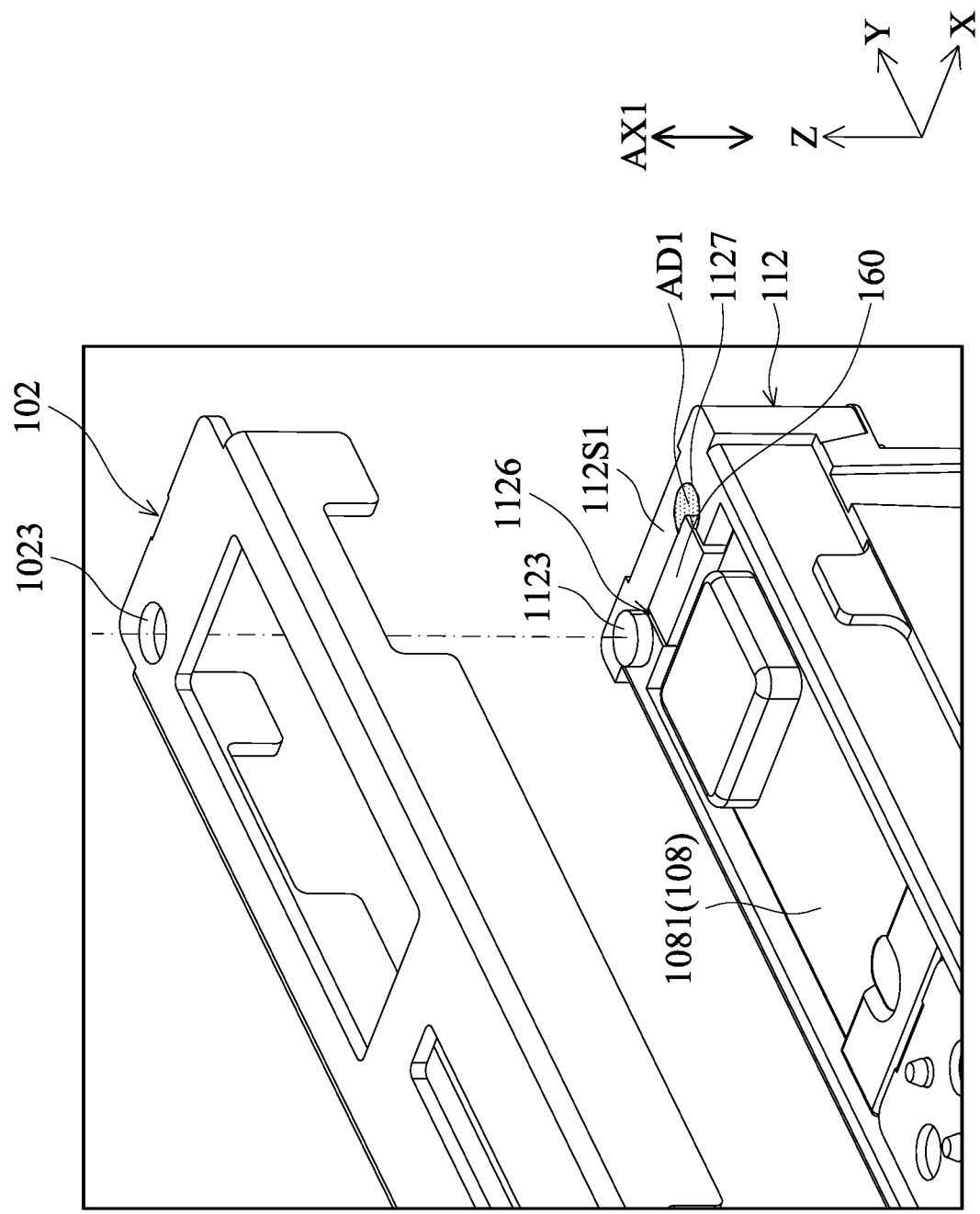
FIG. 11 is a perspective view of a partial structure of the optical element driving mechanism 100 according to an embodiment of the present disclosure.

Please refer to FIG. 11, which is a perspective view of a partial structure of the optical element driving mechanism 100 according to an embodiment of the present disclosure. As shown in FIG. 11, the base 112 further has a first supporting surface 112S1 configured to support the outer frame 102. The base 112 may further have a positioning boss 1123 protruding from the first supporting surface 112S1 along the first axis AX1.

The outer frame 102 may further have a positioning hole 1023 corresponding to the positioning boss 1123. The positioning boss 1123 is configured to tightly engaged with the positioning hole 1023. After the outer frame 102 is installed on the base 112, in the first axis AX1, the maximum distance between the positioning boss 1123 and the first supporting surface 112S1 is smaller than the maximum distance between the positioning hole 1023 and the first supporting surface 112S1. That is, the positioning boss 1123 does not protrude from the positioning hole 1023, so such a design can ensure that the optical element driving mechanism 100 achieves the purpose of miniaturization.

Figure 12:
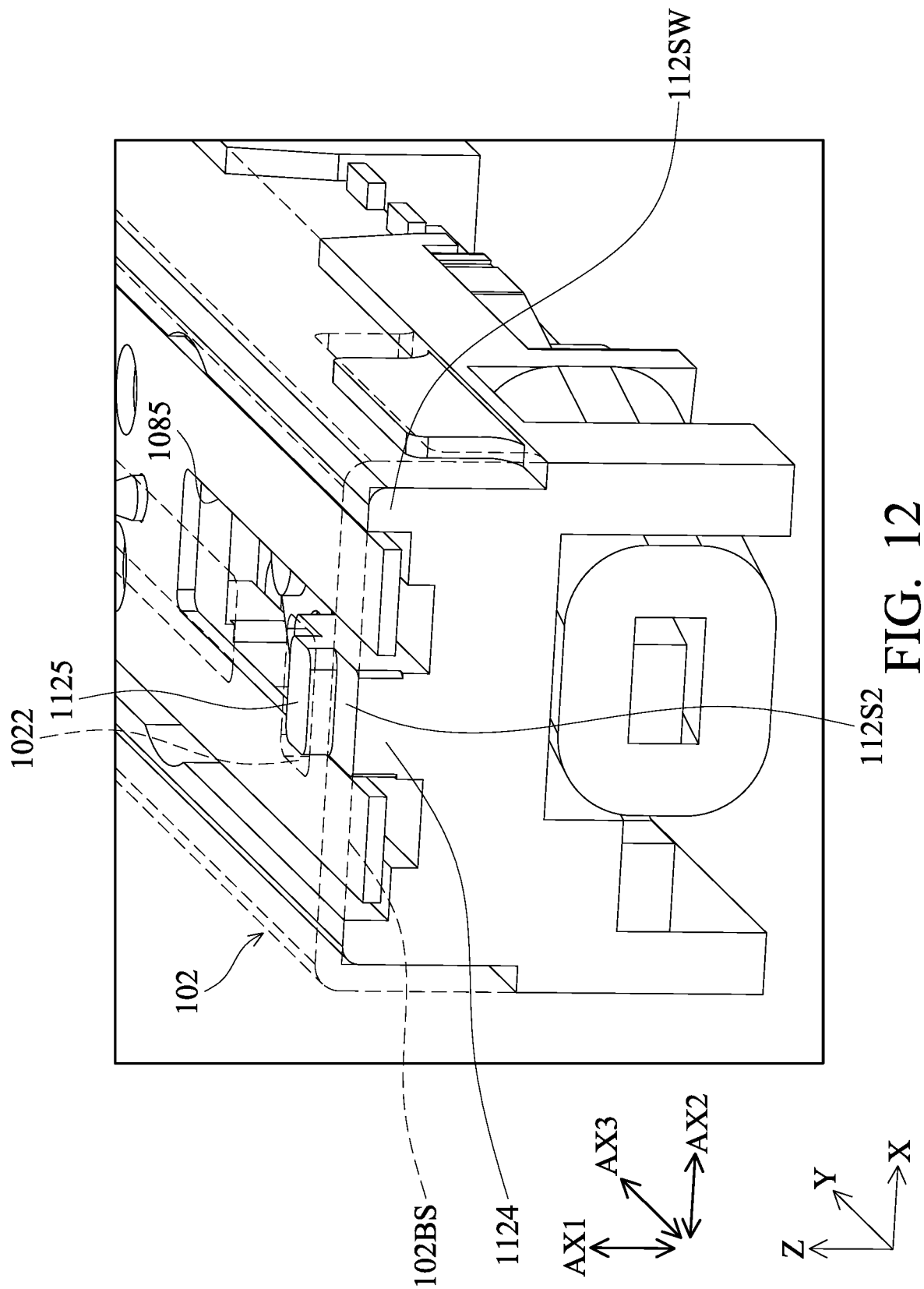
FIG. 12 is a three-dimensional cross-sectional view of the optical element driving mechanism 100 along the line B-B in FIG. 1 according to an embodiment of the present disclosure.

Please refer to FIG. 2 and FIG. 12. FIG. 12 is a three-dimensional cross-sectional view of the optical element driving mechanism 100 along the line B-B in FIG. 1 according to an embodiment of the present disclosure. In this embodiment, the base 112 further includes a supporting bump 1124 configured to support the outer frame 102. As shown in FIG. 2, in the third axis AX3, the supporting bump 1124 is located between the first side wall SW1 and the holder 1081 of the first movable part 108.

The base 112 further has a second supporting surface 112S2 disposed on the supporting bump 1124 and configured to be in contact with a bottom surface 102BS of the outer frame 102. In the first axis AX1, the distance between the second supporting surface 112S2 and the outer frame 102 is greater than or equal to the distance between a side wall 112SW of the base 112 and the outer frame 102.

Furthermore, the base 112 may further include a supporting protruding portion 1125 disposed on the second supporting surface 112S2 of the supporting bump 1124. The outer frame 102 may further include a receiving opening 1022 configured to accommodate the supporting protruding portion 1125. When viewed along the third axis AX3, the size of the receiving opening 1022 is larger than the size of the supporting protruding portion 1125. When viewed along the second axis AX2, the size of the receiving opening 1022 is larger than the size of the supporting protruding portion 1125.

In addition, when viewed along the third axis AX3, the maximum distance between the supporting protruding portion 1125 and the second supporting surface 112S2 in the first axis AX1 is smaller than the maximum distance between the receiving opening 1022 and the second supporting surface 112S2 in the first axis AX1. That is, the supporting protruding portion 1125 does not protrude from the receiving opening 1022.

The supporting protruding portion 1125 can serve as a positioning structure to help the outer frame 102 to be accurately installed on the base 112, and when the optical element driving mechanism 100 is subjected to the aforementioned external force PR, the supporting protruding portion 1125 and the supporting bump 1124 can also be used as a part of the strengthening assembly to resist the external force PR, so as to avoid the problem of the optical element driving mechanism 100 being crushed.

In addition, as shown in FIG. 2 and FIG. 12, the optical element 1082 has a first trench 1085 configured to accommodate the supporting bump 1124. When viewed along the second axis AX2, the supporting bump 1124 overlaps the first trench 1085. Based on the design of the first trench 1085, it can be ensured that the first movable part 108 can move stably along the third axis AX3.

Figure 13:
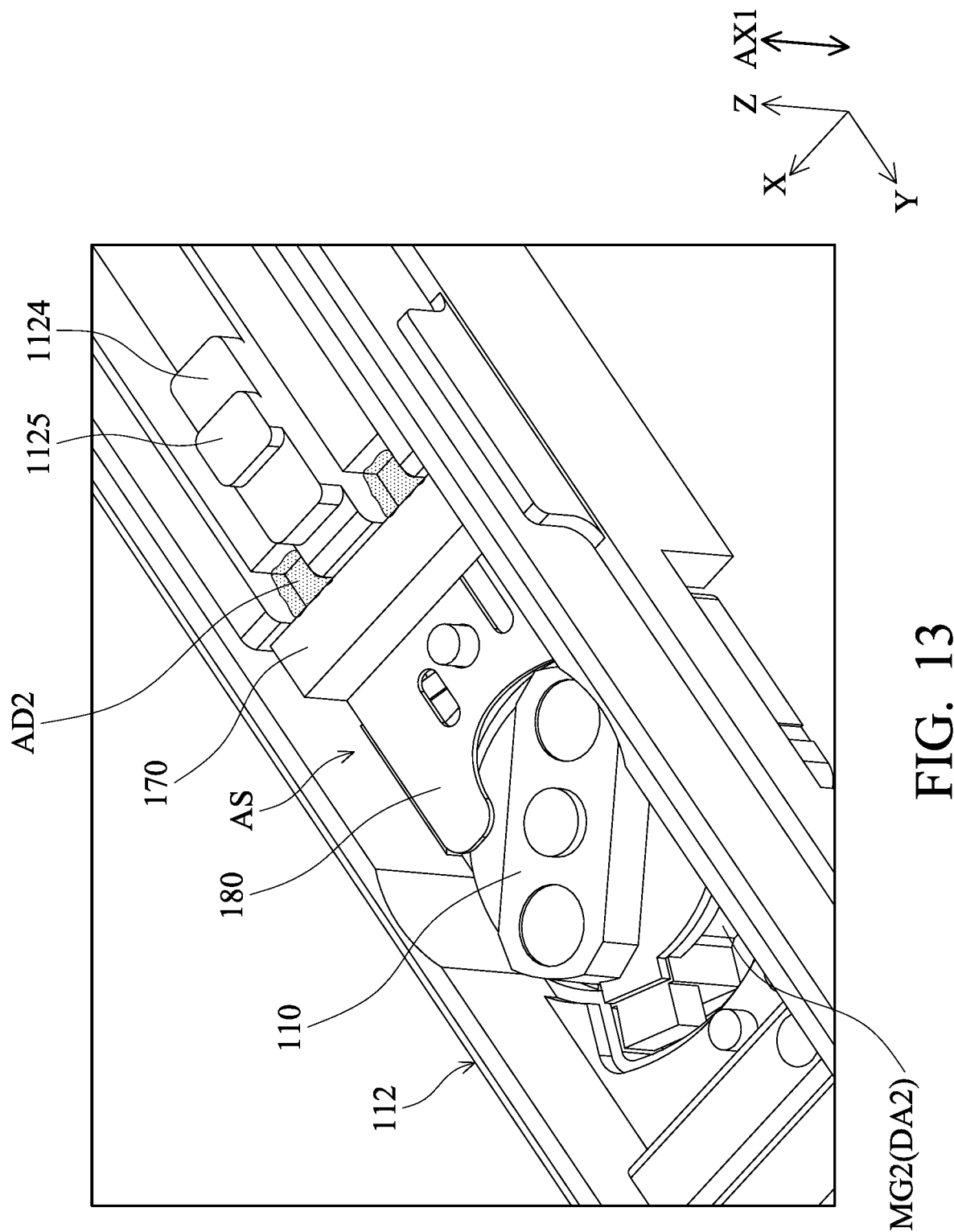
FIG. 13 is a perspective view of a partial structure of the optical element driving mechanism 100 according to an embodiment of the present disclosure.

Please refer to FIG. 11 and FIG. 13. FIG. 13 is a perspective view of a partial structure of the optical element driving mechanism 100 according to an embodiment of the present disclosure. In the present disclosure, the first driving assembly DA1 is configured to drive the first movable part 108 to move between the first position and the second position. In order to increase the durability of the first movable part 108, the optical element driving mechanism 100 may further include a first buffering element 160 and a second buffering element 170 configured to block the holder 1081 of the first movable part 108.

As shown in FIG. 11, the base 112 further has a first rear groove 1126 configured to accommodate the first buffering element 160. When the first movable part 108 is in the first position, the holder 1081 of the first movable part 108 is in contact with the first buffering element 160. The first buffering element 160 is made of sponge, soft plastic, silicone, or a combination thereof.

Furthermore, the base 112 further has a second rear groove 1127 communicated with the first rear groove 1126. The first rear groove 1126 is adjacent to the positioning boss 1123, and when viewed along the first axis AX1, the first buffering element 160 overlaps at least a portion of the first rear groove 1126.

The second rear groove 1127 is configured to receive a first attaching element AD1, and the first attaching element AD1 is configured to attach the first buffering element 160 to the base 112 fixedly.

In addition, as shown in FIG. 13, the second buffering element 170 is disposed in the accommodation space AS of the base 112. When the first movable part 108 is located in the second position, the holder 1081 of the first movable part 108 is in contact with the second buffering element 170. The second buffering element 170 is made of sponge, soft plastic, silicone, or a combination thereof.

When viewed along the first axis AX1, the first movable part 108 is located between the second buffering element 170 and the first buffering element 160 (FIG. 2). In addition, as shown in FIG. 13, the optical element driving mechanism 100 further includes a second attaching element AD2 configured to fixedly attach the second buffering element 170 to the base 112.

Furthermore, as shown in FIG. 13, the optical element driving mechanism 100 may further include a blocking member 180. In the first axis AX1, the second movable part 110 is located between the blocking member 180 and the second driving assembly DA2.

The blocking member 180 is configured to block the second movable part 110 and the second driving assembly DA2 from separating from the base 112, and the second buffering element 170 is disposed on the blocking member 180 and is in direct contact with the blocking member 180.

Figure 14:
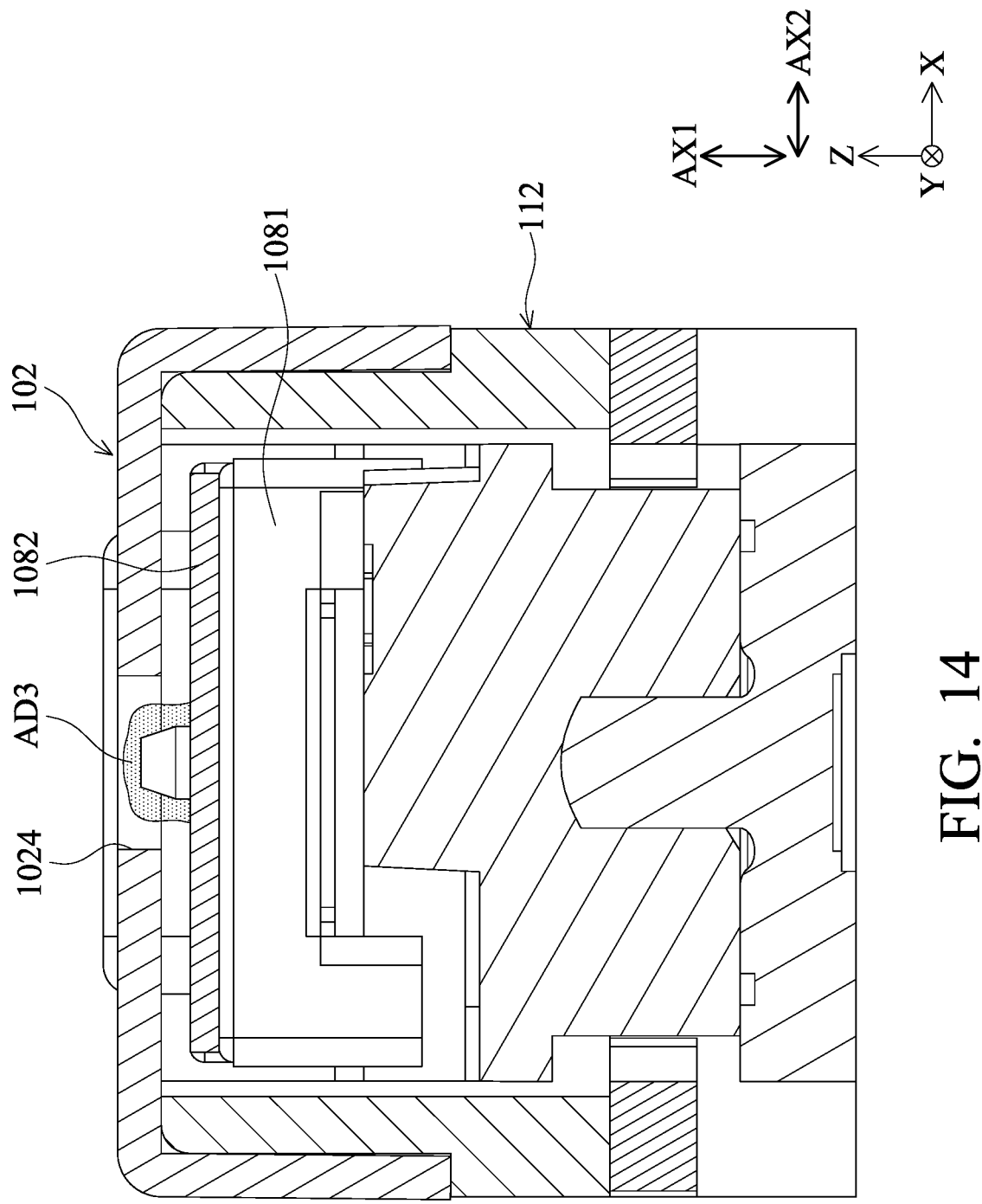
FIG. 14 is a cross-sectional view of the optical element driving mechanism 100 along the line C-C in FIG. 1 according to an embodiment of the present disclosure.

Please refer to FIG. 2 and FIG. 14. FIG. 14 is a cross-sectional view of the optical element driving mechanism 100 along the line C-C in FIG. 1 according to an embodiment of the present disclosure. The holder 1081 of the first movable part 108 is connected to the optical element 1082 through a third attaching element AD3.

The outer frame 102 further has a second trench 1024 corresponding to the third attaching element AD3. When viewed along the second axis AX2, the third attaching element AD3 overlaps the second trench 1024, and when viewed along the third axis AX3, the third attaching element AD3 overlaps the second trench 1024.

Specifically, when viewed along the second axis AX2, the third attaching element AD3 does not protrude from the second trench 1024, and when viewed along the third axis AX3, the third attaching element AD3 does not protrude from the second trench 1024.

In summary, the present disclosure provides an optical element driving mechanism, including a first movable part, a fixed assembly, and a first driving assembly. The first movable part includes an optical element, and the first movable part is movable relative to the fixed assembly. The first driving assembly is configured to drive the first movable part to move relative to the fixed assembly. The optical element driving mechanism further includes a strengthening assembly configured to strengthen the fixed assembly to bear a force along the first axis.

In addition, in some embodiments, the first front side portion SW21 of the outer frame 102 has a first inclined surface ICS1, and the base 112 has a second inclined surface ICS2 corresponding to the first inclined surface ICS1. When the outer frame 102 is configured to be installed on the base 112, the second inclined surface ICS2 can guide the first inclined surface ICS1, so that the outer frame 102 is smoothly installed on the base 112.

Furthermore, in some embodiments, when the optical element driving mechanism 100 is subjected to the external force PR along the first axis AX1, the first side wall SW1 is in contact with the first supporting portion 15, the second side wall SW2 is in contact with the second supporting portion SP2, and the third side wall SW3 is in contact with the third supporting portion SP3, so that the external force PR is distributed to the first supporting portion 15, the second supporting portion SP2 and the third supporting portion SP3. Based on this structural configuration, the situation in which the optical element driving mechanism 100 is crushed can be avoided.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
a first movable part, including an optical element;
a fixed assembly, wherein the first movable part is movable relative to the fixed assembly;
a first driving assembly, configured to drive the first movable part to move relative to the fixed assembly;
wherein the optical element driving mechanism further includes a strengthening assembly configured to strengthen the fixed assembly to bear a force along a first axis;
wherein the fixed assembly includes an outer frame and a base;
the outer frame is configured to be assembled to the base;
the outer frame includes a top wall extending along a third axis, and the third axis is perpendicular to the first axis;
wherein the strengthening assembly includes:
a first side wall, extending from the top wall;
a second side wall, extending from the top wall; and
a third side wall, extending from the top wall;
wherein before the outer frame is assembled to the base, the first side wall, the second side wall and the third side wall extend along the first axis;
wherein when viewed along the third axis, the second side wall and the third side wall are located on opposite sides of the top wall;
wherein when viewed along the third axis, and after the outer frame is assembled to the base, the second side wall having a plate-shaped structure is not parallel to the third side wall having a plate-shaped structure;
wherein the strengthening assembly further includes:
a first supporting portion, corresponding to the first side wall;
a second supporting portion corresponding to the second side wall; and
a third supporting portion, corresponding to the third side wall;
in the first axis, a shortest distance between the first side wall and the first supporting portion is smaller than a shortest distance between the fixed assembly and an optical module corresponding to the optical element driving mechanism.

2. The optical element driving mechanism as claimed in claim 1, wherein
when the optical element driving mechanism is subjected to an external force along the first axis, the first side wall is in contact with the first supporting portion, the second side wall is in contact with the second supporting portion, and the third side wall is in contact with the third supporting portion so that the external force is distributed to the first supporting portion, the second supporting portion and the third supporting portion.

3. The optical element driving mechanism as claimed in claim 2, wherein
the outer frame is configured to be fixedly connected to the base;
the first side wall, the second side wall and the third side wall are located on the outer frame;
the second supporting portion and the third supporting portion are located on the base;
when the outer frame is assembled to the base, the first side wall having a plate-shaped structure is not parallel to the second side wall having the plate-shaped structure.

4. The optical element driving mechanism as claimed in claim 3, wherein
when the outer frame is assembled to the base, the second side wall is not parallel to the first axis;
when the outer frame is assembled to the base, the third side wall is not parallel to the first axis;
a first slit is formed between the second side wall and the base in a second axis;
a second slit is formed between the third side wall and the base in the second axis;
the first slit or the second slit is less than 0.02 mm;
the second axis is perpendicular to the first axis.

5. The optical element driving mechanism as claimed in claim 4, wherein
a first glue groove is formed between the outer frame and the base, and is configured to accommodate a first adhesive element;
the first glue groove is communicated with the first slit, so that the first adhesive element flows into the first slit;
a second glue groove is formed between the outer frame and the base, and is configured to accommodate a second adhesive element;
the second glue groove is communicated with the second slit, so that the second adhesive element flows into the second slit.

6. The optical element driving mechanism as claimed in claim 5, wherein the second side wall includes a first front side portion configured to be in contact with the second supporting portion;

the first front side portion has a first inclined surface;

the base has a second inclined surface corresponding to the first inclined surface;

when the outer frame is configured to be installed on the base, the second inclined surface is configured to guide the first inclined surface.

7. The optical element driving mechanism as claimed in claim 6, wherein after the outer frame is assembled to the base, the second inclined surface does not contact the first inclined surface;

the base further has an arc blocking portion protruding from the second inclined surface;

the first front side portion further has an avoiding groove corresponding to the arc blocking portion;

a radius of curvature of the arc blocking portion is smaller than a radius of curvature of the avoiding groove;

the arc blocking portion is configured to block the avoiding groove to prevent the outer frame from separating from the base.

8. The optical element driving mechanism as claimed in claim 7, wherein when viewed along the second axis, the arc blocking portion does not contact the avoiding groove;

a space is formed between the arc blocking portion and an outer side surface of the base in the second axis.

9. The optical element driving mechanism as claimed in claim 8, wherein the second side wall further includes a first rear side portion configured to be in contact with the second supporting portion;

when viewed along the second axis, in the third axis, another space is formed between the first rear side portion and the base;

the third axis is perpendicular to the second axis and the first axis.

10. The optical element driving mechanism as claimed in claim 9, wherein the base further has a first supporting surface configured to support the outer frame;

the base further has a positioning boss which protrudes from the first supporting surface along the first axis;

the outer frame has a positioning hole, corresponding to the positioning boss;

the positioning boss is configured to be engaged with the positioning hole;

in the first axis, a maximum distance between the positioning boss and the first supporting surface is smaller than a maximum distance between the positioning hole and the first supporting surface.

11. The optical element driving mechanism as claimed in claim 10, wherein the base further includes a supporting bump configured to support the outer frame;

in the third axis, the supporting bump is located between the first side wall and the first movable part;

the base further has a second supporting surface disposed on the supporting bump and is configured to be in contact with a bottom surface of the outer frame;

in the first axis, a distance between the second supporting surface and the outer frame is greater than a distance between the base and the outer frame.

12. The optical element driving mechanism as claimed in claim 11, wherein the base further includes a supporting protruding portion disposed on the second supporting surface of the supporting bump;

the outer frame further includes a receiving opening configured to accommodate the supporting protruding portion;

when viewed along the third axis, a size of the receiving opening is greater than a size of the supporting protruding portion;

when viewed along the third axis, a maximum distance between the supporting protruding portion and the second supporting surface in the first axis is less than a maximum distance between the receiving opening and the second supporting surface in the first axis.

13. The optical element driving mechanism as claimed in claim 12, wherein the optical element has a first trench configured to accommodate the supporting bump;

when viewed along the second axis, the supporting bump overlaps the first trench.

14. The optical element driving mechanism as claimed in claim 13, wherein the first driving assembly is configured to drive the first movable part to move between a first position and a second position;

the base has a first rear groove configured to accommodate a first buffering element;

when the first movable part is located in the first position, the first movable part is in contact with the first buffering element;

the first buffering element is made of sponge, soft plastic, silicone, or a combination thereof.

15. The optical element driving mechanism as claimed in claim 14, wherein the base further has a second rear groove communicated with the first rear groove;

the first rear groove is adjacent to the positioning boss;

when viewed along the first axis, the first buffering element overlaps at least a part of the first rear groove;

the second rear groove is configured to receive a first attaching element;

the first attaching element is configured to fixedly attach the first buffering element to the base.

16. The optical element driving mechanism as claimed in claim 15, wherein the optical element driving mechanism further includes a second buffering element disposed in an accommodation space of the base;

when the first movable part is located in the second position, the first movable part is in contact with the second buffering element;

the second buffering element is made of sponge, soft plastic, silicone, or a combination thereof;

when viewed along the first axis, the first movable part is located between the second buffering element and the first buffering element;

the optical element driving mechanism further includes a second attaching element configured to fixedly attach the second buffering element to the base.

17. The optical element driving mechanism as claimed in claim 16, wherein the optical element driving mechanism further includes a second movable part, a second driving assembly and a blocking member;

the second driving assembly is configured to drive the second movable part to rotate around the first axis;

in the first axis, the second movable part is located between the blocking member and the second driving assembly;

the blocking member is configured to block the second movable part and the second driving assembly from separating from the base;

the second buffering element is disposed on the blocking member and is in direct contact with the blocking member.

18. The optical element driving mechanism as claimed in claim 17, wherein a holder of the first movable part is connected to the optical element through a third attaching element;

the outer frame further has a second trench corresponding to the third attaching element;

when viewed along the second axis, the third attaching element overlaps the second trench;

when viewed along the third axis, the third attaching element overlaps the second trench;

when viewed along the second axis, the third attaching element does not protrude from the second trench;

when viewed along the third axis, the third attaching element does not protrude from the second trench.

19. The optical element driving mechanism as claimed in claim 5, wherein the optical module is disposed on the first supporting portion;

the optical module is electrically connected to the first supporting portion;

the optical module has a camera lens;

the base has a receiving groove configured to accommodate the optical module;

when viewed along the first axis, the base overlaps a part of the optical module;

when viewed along the first axis, the camera lens does not overlap the base.

* * * * *